United States Patent
Wang

(10) Patent No.: US 11,624,422 B2
(45) Date of Patent: Apr. 11, 2023

(54) LINK CONNECTING STRUCTURE

(71) Applicant: Wen-Pin Wang, Tainan (TW)

(72) Inventor: Wen-Pin Wang, Tainan (TW)

(*) Notice: Subject to any disclaimer, the term of this patent is extended or adjusted under 35 U.S.C. 154(b) by 189 days.

(21) Appl. No.: 17/036,501

(22) Filed: Sep. 29, 2020

(65) Prior Publication Data

US 2022/0099158 A1 Mar. 31, 2022

(51) Int. Cl.
*F16G 13/06* (2006.01)
*F16G 13/02* (2006.01)
*B62M 9/00* (2006.01)

(52) U.S. Cl.
CPC ............. *F16G 13/06* (2013.01); *F16G 13/02* (2013.01); *B62M 2009/005* (2013.01)

(58) Field of Classification Search
CPC .......... F16G 13/00; F16G 13/02; F16G 13/04; F16G 13/06; F16G 13/08; F16G 13/10; F16G 13/12; B62M 9/00; B62M 2009/005; B62M 9/06; B62M 9/12
See application file for complete search history.

(56) References Cited

U.S. PATENT DOCUMENTS

| | | | | |
|---|---|---|---|---|
| 3,630,097 A * | 12/1971 | Kuratomi | ............... | F16G 13/06 474/230 |
| 4,102,216 A * | 7/1978 | Nagano | ................. | F16G 13/06 474/231 |
| 4,297,839 A * | 11/1981 | Gurney | ................. | B65G 17/38 59/85 |
| 5,151,066 A * | 9/1992 | Wu | ................. | F16G 13/06 474/213 |
| 5,322,482 A * | 6/1994 | Wang | ................. | F16G 13/06 474/206 |
| 6,364,799 B1 * | 4/2002 | Campagnolo | ........... | F16G 13/06 474/227 |
| 6,662,544 B1 * | 12/2003 | Wu | ................. | F16G 13/06 59/8 |
| 7,437,870 B2 * | 10/2008 | Wu | ................. | F16G 13/06 474/212 |
| 7,712,298 B1 * | 5/2010 | Wang | ................. | F16G 13/06 59/5 |

(Continued)

FOREIGN PATENT DOCUMENTS

| | | |
|---|---|---|
| JP | S56106253 U | 8/1981 |
| TW | 545536 U | 8/2003 |

(Continued)

*Primary Examiner* — Michael R Mansen
*Assistant Examiner* — Raveen J Dias
(74) *Attorney, Agent, or Firm* — Rosenberg, Klein & Lee

(57) ABSTRACT

A link connecting structure includes two outer link plates and two inner link plates. An inner side of each outer link plate is formed with a concave portion between two first coupling portions at two ends thereof. A connecting surface is connected between each first coupling portion and the concave portion. The connecting surface is gradually tapered inward from each first coupling portion toward the concave portion. An outer side of each inner link plate is provided with a pair of bent portions each extending from an outermost edge of each second coupling portion toward the connecting surface. A gap is defined between each bent portion and the connecting surface. The gap is less than the minimum thickness of a narrow tooth of a chainring, thereby preventing the tooth from being jammed in the gap.

5 Claims, 9 Drawing Sheets

(56) References Cited

U.S. PATENT DOCUMENTS

| | | | | |
|---|---|---|---|---|
| 7,749,119 B2* | 7/2010 | Meggiolan | F16G 13/06 474/227 |
| 7,837,584 B2* | 11/2010 | Wu | F16G 13/06 474/227 |
| 8,066,604 B2* | 11/2011 | Righi | F16G 13/06 474/228 |
| 8,734,280 B2* | 5/2014 | Oishi | F16G 13/06 474/230 |
| 9,303,725 B2* | 4/2016 | Fukumori | B62M 9/00 |
| 9,303,726 B2* | 4/2016 | Fukumori | F16G 13/06 |
| 9,541,159 B2* | 1/2017 | Wang | F16G 13/06 |
| 9,939,045 B2* | 4/2018 | Fukumori | F16G 13/06 |
| 10,125,846 B2* | 11/2018 | Fukumori | F16G 13/06 |
| 10,371,234 B2* | 8/2019 | Civiero | F16G 13/06 |
| 10,480,617 B2* | 11/2019 | Fukumori | F16G 13/02 |
| 10,487,915 B2* | 11/2019 | Wu | B62M 9/12 |
| 10,618,598 B2* | 4/2020 | Fukumori | F16G 15/12 |
| 10,641,356 B2* | 5/2020 | Fukumori | F16G 13/06 |
| 10,760,647 B2* | 9/2020 | Chin | F16G 13/06 |
| 10,794,452 B2* | 10/2020 | Fukumori | F16G 13/06 |
| 10,982,734 B2* | 4/2021 | Ribeiro | F16G 13/06 |
| 2003/0022747 A1* | 1/2003 | Meggiolan | B25B 27/22 474/227 |
| 2005/0164816 A1* | 7/2005 | Wang | F16G 13/06 474/228 |
| 2007/0180808 A1* | 8/2007 | Wu | F16G 13/06 59/84 |
| 2007/0249449 A1* | 10/2007 | Wu | F16G 13/06 474/206 |
| 2011/0081195 A1* | 4/2011 | Wang | F16G 13/06 403/119 |
| 2012/0322599 A1* | 12/2012 | Oishi | F16G 13/06 474/230 |
| 2015/0094180 A1* | 4/2015 | Fukumori | F16G 13/06 474/206 |
| 2015/0094181 A1* | 4/2015 | Fukumori | F16G 13/06 474/206 |
| 2016/0040753 A1* | 2/2016 | Wang | F16G 13/06 474/226 |
| 2016/0153526 A1* | 6/2016 | Wang | F16G 13/06 474/226 |
| 2017/0067535 A1* | 3/2017 | Fukumori | F16G 13/06 |
| 2017/0138439 A1* | 5/2017 | Civiero | B62M 9/10 |
| 2018/0017131 A1* | 1/2018 | Fukumori | F16G 13/06 |
| 2018/0187749 A1* | 7/2018 | Fukumori | F16G 13/06 |
| 2019/0048973 A1* | 2/2019 | Fukumori | F16H 55/30 |
| 2019/0100278 A1* | 4/2019 | Fukumori | B62M 9/00 |
| 2019/0309826 A1* | 10/2019 | Fukumori | F16G 15/04 |
| 2020/0247503 A1* | 8/2020 | Ribeiro | B62M 1/36 |

FOREIGN PATENT DOCUMENTS

| | | | |
|---|---|---|---|
| TW | 201910663 A | 3/2019 | |
| WO | WO-2006051472 A1 * | 5/2006 | B65G 17/126 |

* cited by examiner

LINK CONNECTING STRUCTURE

FIELD OF THE INVENTION

The present invention relates to a link connecting structure, and more particularly to inner and outer link plates that are connected in a seamless manner. When the chain is shifted, the teeth of the cassette won't be jammed to make a noise and cause a danger.

BACKGROUND OF THE INVENTION

The speed change mechanism of a general bicycle usually comprises a chainring having a plurality of narrow teeth and wide teeth that are interlaced and arranged around the periphery of the chainring, a cassette composed of a plurality of cogs with different diameters, and a derailleur for shifting the chain to be engaged with one of the cogs. The chainring for speed change has narrow teeth arranged around the periphery of the chainring. In the chain, an accommodating space with a smaller gap is formed between two inner link plates of each link of the chain for the narrow teeth of the chainring and the narrow teeth of the cassette to be engaged therein. Another accommodating space with a larger gap is formed between two outer link plates of each link of the chain for the wide teeth of the chainring to be engaged therein. When the chain is to be disengaged from or engaged with the cassette, there will be obstacles to the outer link plates and the inner link plates of the chain and the wide and narrow teeth of the chainring. As a result, it affects the smooth operation of shifting the chain and makes a noise or damages the parts.

Taiwan Patent No. 201910663 discloses a bicycle chain, published on Mar. 16, 2019. The bicycle chain comprises a first inner link plate and a second inner link plate. The first inner link plate includes a first end portion, a second end portion, and a first middle portion. The second inner link plate includes a third end portion, a fourth end portion, and a second middle portion. The end edge of the first end portion has a first chamfer extending around the central axis of the first inner link plate, so that a part of the first chamfer is disposed in a first circumferential area. When viewed in an axial direction of the central axis of the first inner link plate, the first circumferential area is defined from a longitudinal center line of the first inner link plate to a first reference line. The first circumferential area is less than 14 degrees.

However, in the foregoing patent or a conventional chain structure, as shown in FIG. 9, a concave portion A1 is formed on the inner side of each of two outer link plates A, and a convex portion B1 is formed on the end edge of each of two inner link plates B. The concave portion A1 increases the accommodating space for the wide teeth of the chainring to be engaged in the link composed of the inner and outer link plates, so the wide teeth can be engaged in the link of the chain smoothly. But, a gap C is formed between the opposite sides of the convex portion B1 and the concave portion A1. When the chain is shifted, the narrow tooth D of the chainring will be easily caught in the gap C, so that the narrow tooth D of the cassette will be jammed and the chain cannot be shifted. Sometimes, the outer link plates and the inner link plates may be pried to separate from each other to break the chain. Therefore, there are disadvantages and dangers in use.

SUMMARY OF THE INVENTION

In view of the shortcomings of the prior art, the primary object of the present invention is to provide a link connecting structure. The link connecting structure comprises at least two outer link plates and at least two inner link plates. The two outer link plates are arranged facing each other. Two ends of each outer link plate are provided with first coupling portions, respectively. Each first coupling portion has a first pin hole. An inner side of each outer link plate is formed with a concave portion between the two first coupling portions. A connecting surface is connected between each first coupling portion and the concave portion. The connecting surface is gradually tapered inward from each first coupling portion toward the concave portion. The two inner link plates are coupled between the inner sides of the two outer link plates. Two ends of each inner link plate are provided with second coupling portions, respectively. Each second coupling portion has a second pin hole for a pin to be inserted into the second pin hole and the first pin hole to connect the two inner link plates and the two outer link plates. An outer side of each inner link plate is provided with a pair of bent portions each extending from an outermost edge of each second coupling portion toward the connecting surface. A gap is defined between each bent portion and the connecting surface. The gap is less than a thickness of a tooth of a chainring.

Preferably, the connecting surface is a curved surface.

Preferably, a surface of each bent portion is another curved surface corresponding in shape to the connecting surface.

Alternatively, the connecting surface is an inclined surface.

Alternatively, a surface of each bent portion is another inclined surface corresponding in shape to the connecting surface.

The above technical features have the following advantages:

1. The connecting surface of the outer link plate is gradually tapered inward from each first coupling portion toward the concave portion. The outer side of each inner link plate is provided with a pair of bent portions. A gap is defined between each bent portion and the connecting surface. The gap is less than the minimum thickness of a narrow tooth of a chainring, thereby preventing the tooth from being jammed.

2. The connecting surface is a curved surface. A surface of each bent portion is another curved surface corresponding in shape to the connecting surface. Thus, the tooth will not be jammed, and the outer link plates and the inner link plates will not be pried to separate from each other to break the chain. Therefore, its safety can be ensured in use. Moreover, the chain can be positioned quickly when it is shifted without making any noise.

3. The connecting surface is an inclined surface. A surface of each bent portion is another inclined surface corresponding in shape to the connecting surface. Thus, the tooth will not be jammed, and the outer link plates and the inner link plates will not be pried to separate from each other to break the chain. Therefore, its safety can be ensured in use. Moreover, the chain can be positioned quickly when it is shifted without making any noise.

DETAILED DESCRIPTION OF THE PREFERRED EMBODIMENTS

Embodiments of the present invention will now be described, by way of example only, with reference to the accompanying drawings.

Figure 1:
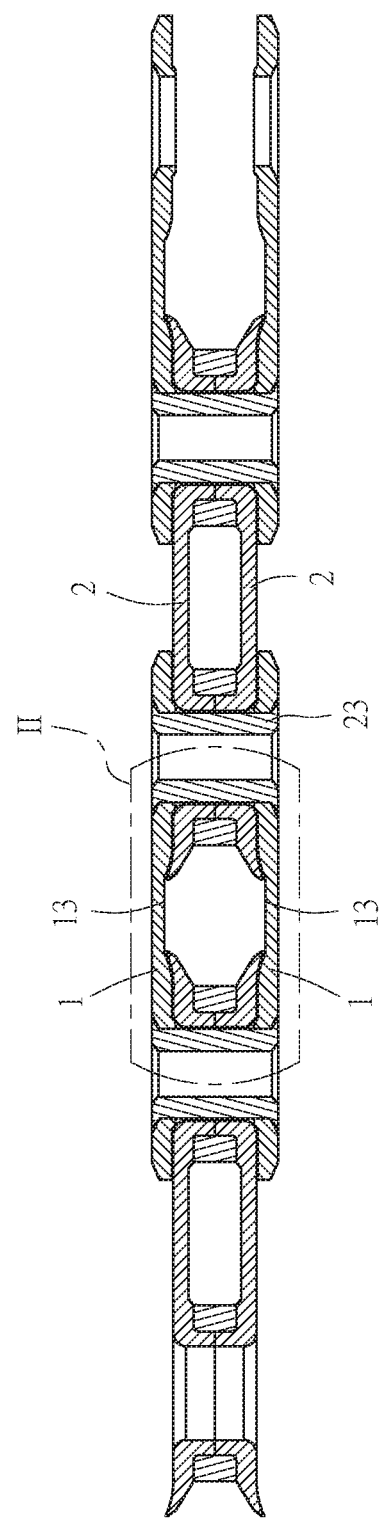
FIG. 1 is a cross-sectional view in accordance with a first embodiment of the present invention.
Figure 2:
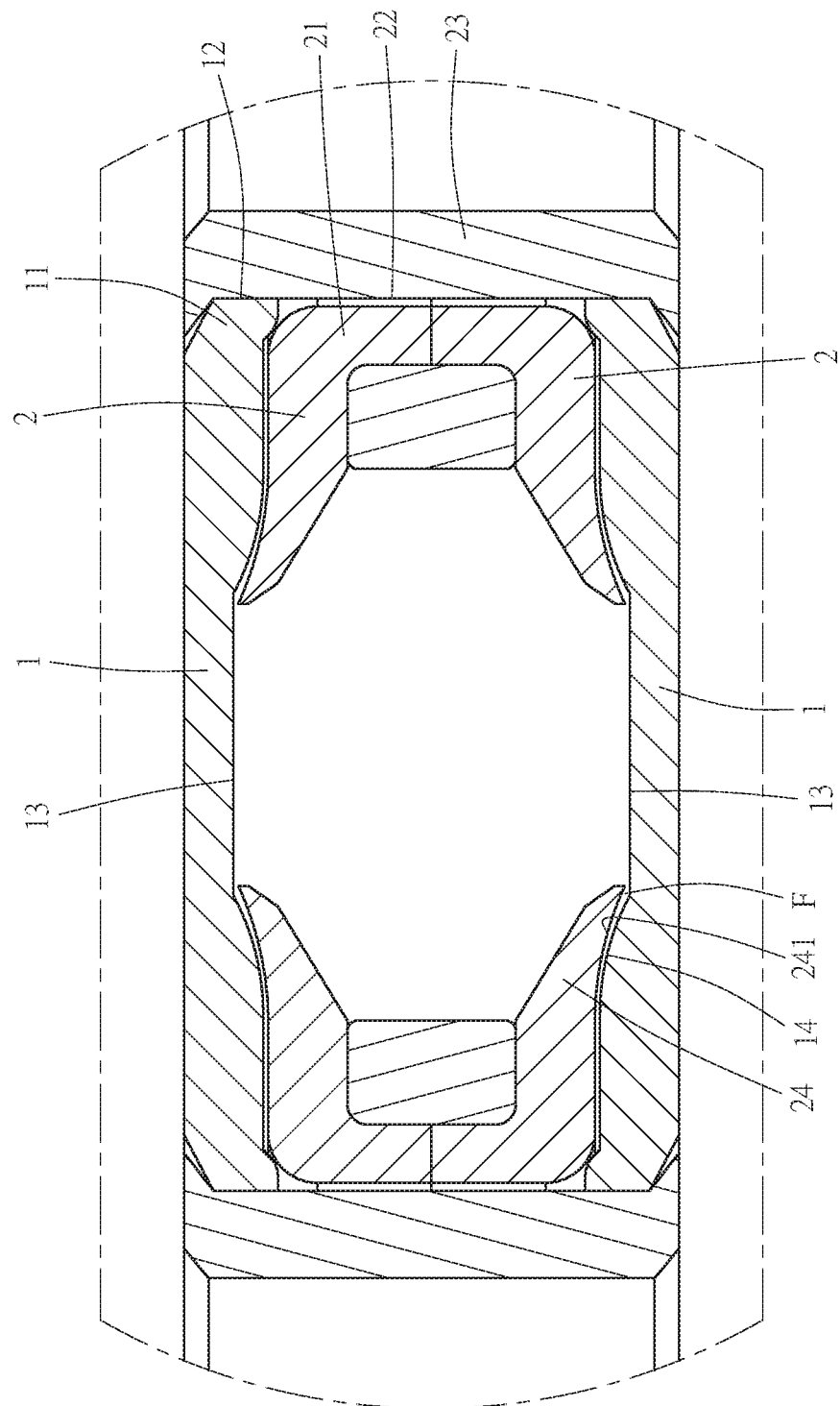
FIG. 2 is an enlarged view of part II of FIG. 1.

As shown in FIG. 1 and FIG. 2, the first embodiment of the present invention comprises at least two outer link plates 1 and at least two inner link plates 2.

Figure 3:
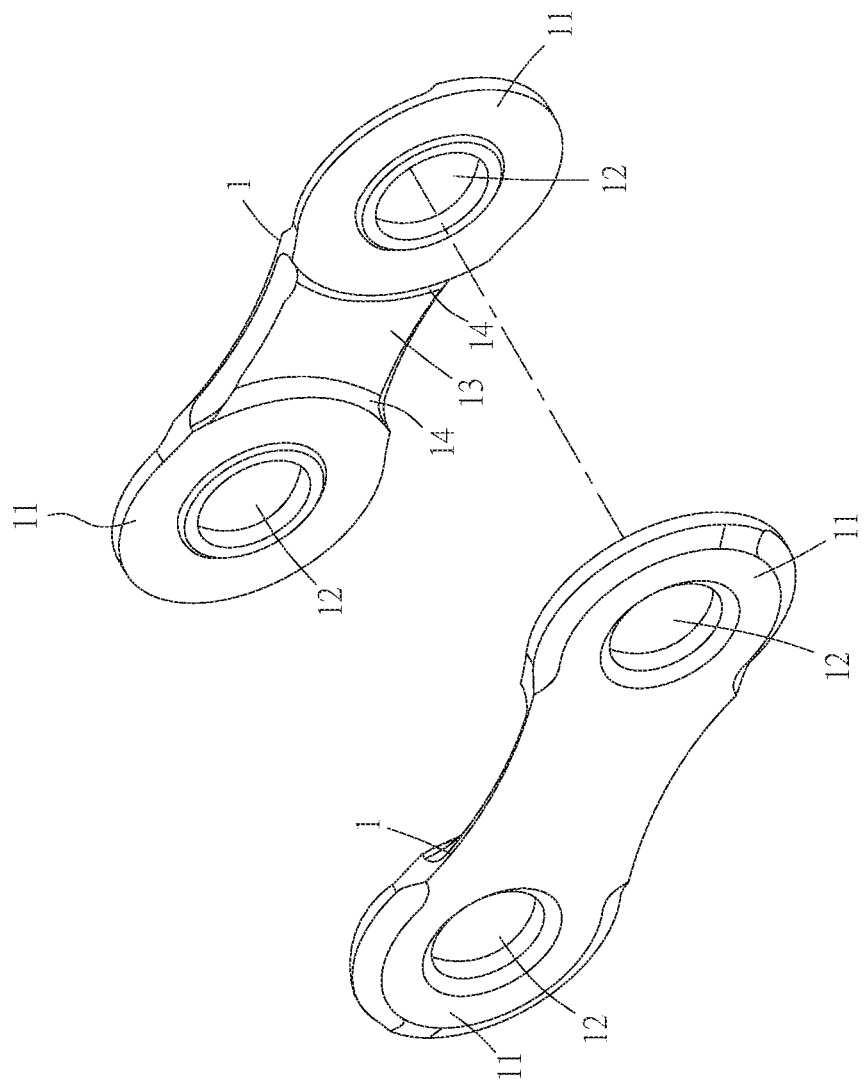
FIG. 3 is a perspective view of the outer link plates in accordance with the first embodiment of the present invention.
Figure 4:
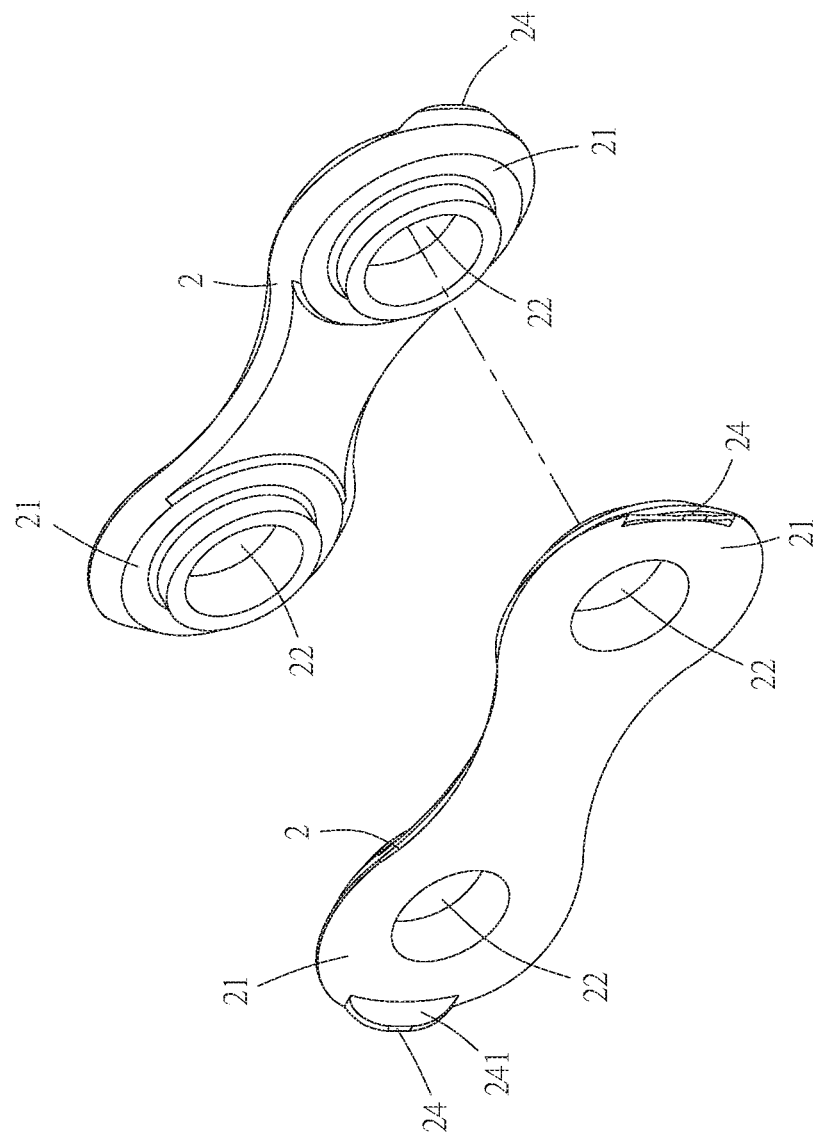
FIG. 4 is a perspective view of the inner link plates in accordance with the first embodiment of the present invention.

The two outer link plates 1 are arranged facing each other. As shown in FIG. 3, two ends of each outer link plate 1 are provided with first coupling portions 11, respectively. Each first coupling portion 11 has a first pin hole 12. The inner side of each outer link plate 1 is formed with a concave portion 13 between the two first coupling portions 11. A connecting surface 14 is connected between each first coupling portion 11 and the concave portion 13. The connecting surface 14 is a curved surface. The connecting surface 14 is gradually tapered inward from each first coupling portion 11 toward the concave portion 13.

The two inner link plates 2 are coupled between the inner sides of the two outer link plates 1. Two ends of each inner link plate 2 are provided with second coupling portions 21, respectively. Each second coupling portion 21 has a second pin hole 22 for a pin 23 to be inserted into the second pin hole 22 and the first pin hole 12 to connect the two inner link plates 2 and the two outer link plates 1. The outer side of each inner link plate 2 is provided with a pair of bent portions 24 each extending from the outermost edge of each second coupling portion 21 toward the connecting surface 14. A surface 241 of each bent portion 24 is another curved surface corresponding in shape to the connecting surface 14. A gap F is defined between each bent portion 24 and the connecting surface 14. The gap F is less than the minimum thickness of a narrow tooth E1 of a chainring (as shown in FIG. 5).

Figure 5:
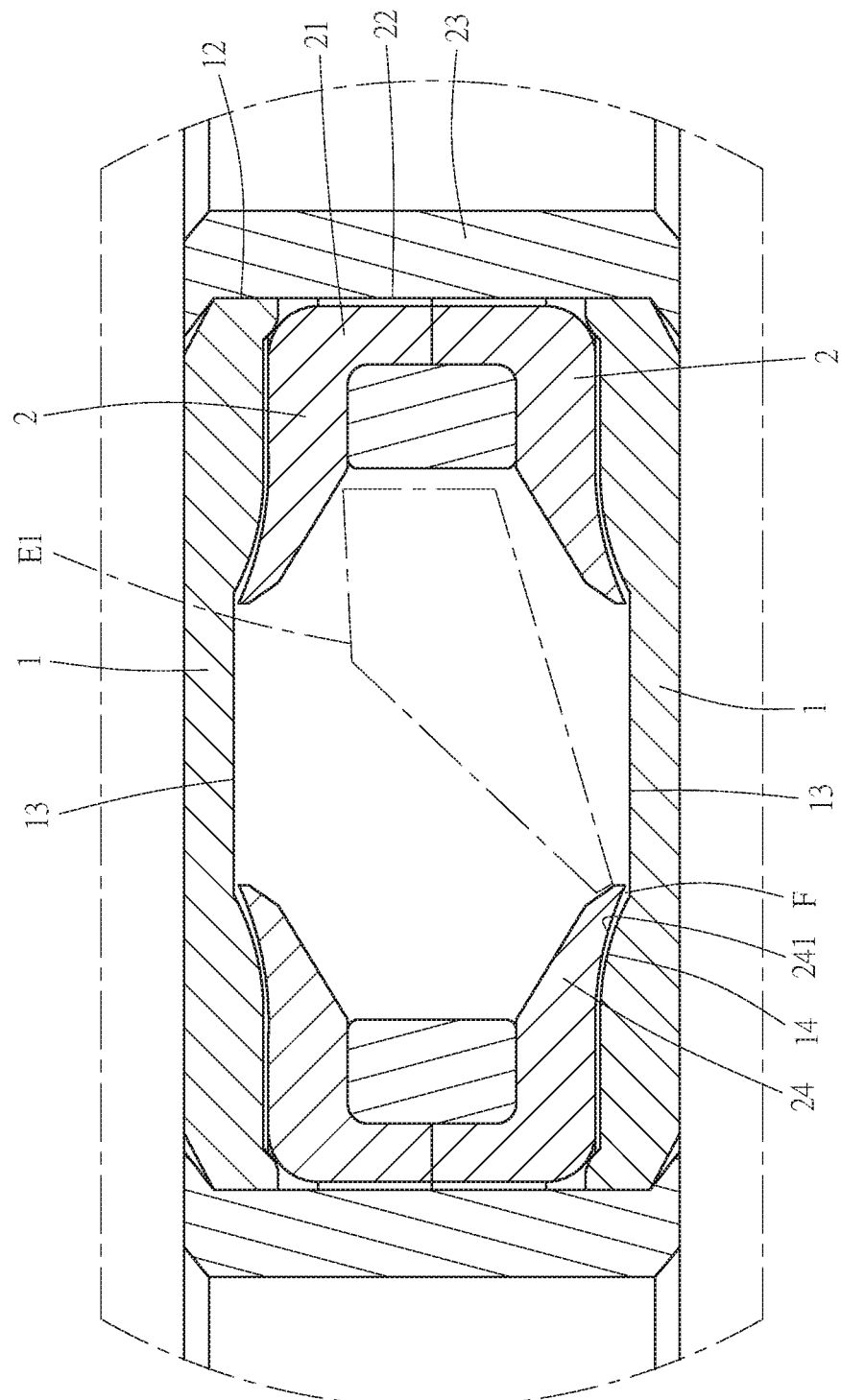
FIG. 5 is a schematic view of the tooth of the cassette to be engaged between the inner link plates and the outer link plates in accordance with the first embodiment of the present invention.

In use, as shown in FIG. 1 and FIG. 5, a plurality of the outer link plates 1 and the inner link plates 2 are combined into a chain. When the chain is shifting, the narrow tooth E1 of the chainring will be engaged between the inner sides of the two outer link plates 1. The concave portion 13 formed between the two first coupling portions 11 of each outer link plate 1 is configured to increase the accommodating space for the tooth E1 to be engaged more smoothly without resistance. Since the connecting surface 14 is a curved surface, the surface 241 of the bent portion 24 is another curved surface corresponding in shape to the connecting surface 14, and the gap F between the bent portion 24 and the connecting surface 14 is less than the minimum thickness of the narrow tooth E1, the tooth E1 will not be caught in the gap F. Thus, the tooth E1 will not be jammed, and the outer link plates 1 and the inner link plates 2 will not be pried to separate from each other to break the chain. Therefore, its safety can be ensured in use. Moreover, the chain can be positioned quickly when it is shifted without making any noise.

Figure 6:
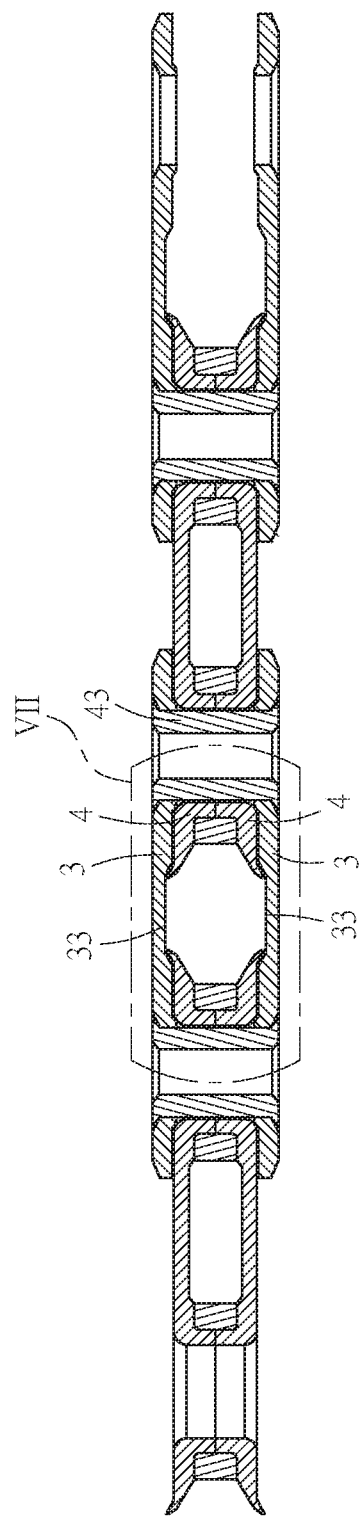
FIG. 6 is a cross-sectional view in accordance with a second embodiment of the present invention.
Figure 7:
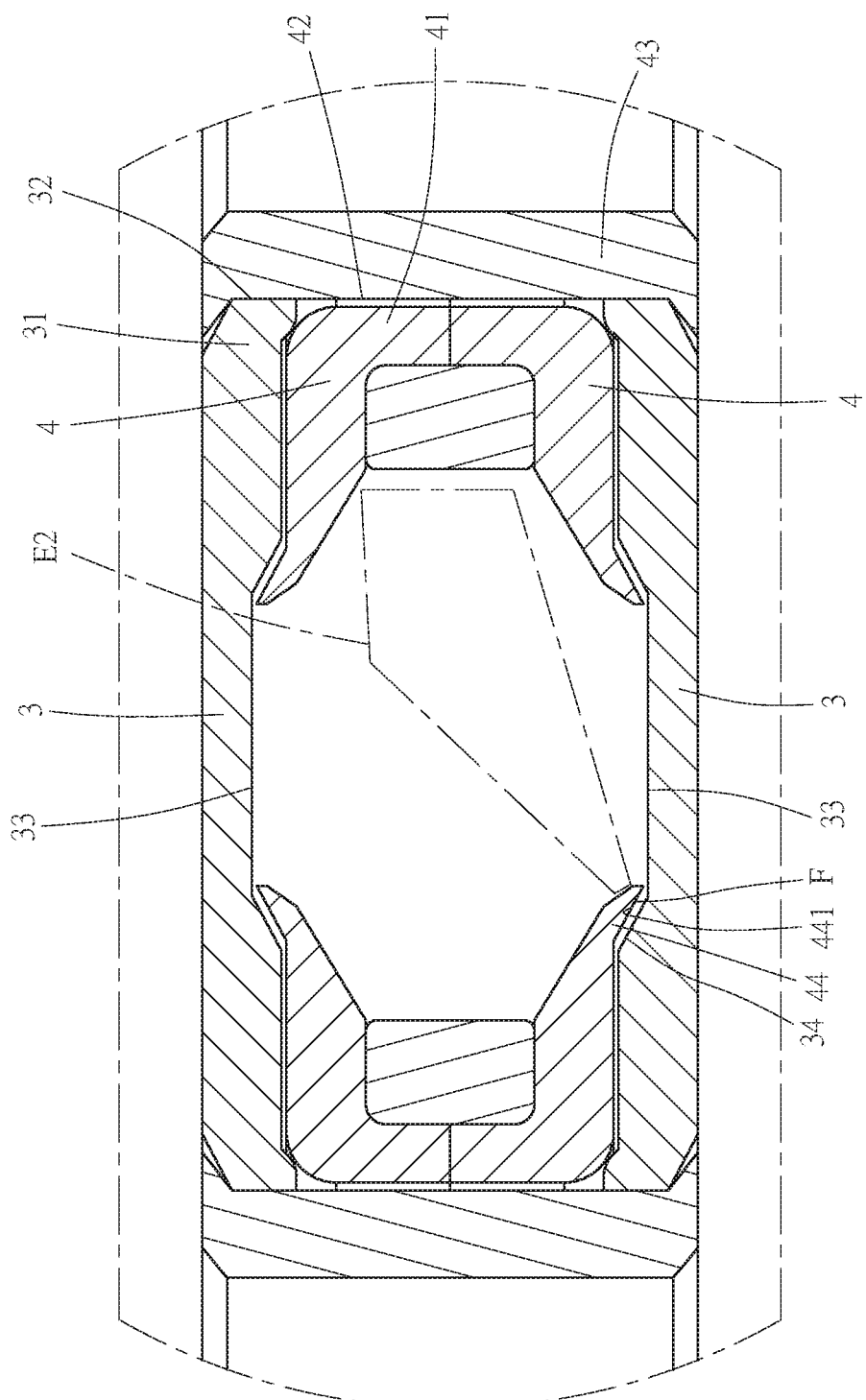
FIG. 7 is an enlarged view of part III of FIG. 6.

As shown in FIG. 6 and FIG. 7, the second embodiment of the present invention comprises at least two outer link plates 3 and at least two inner link plates 4.

The two outer link plates 3 are arranged facing each other. Two ends of each outer link plate 3 are provided with first coupling portions 31, respectively. Each first coupling portion 31 has a first pin hole 32. The inner side of each outer link plate 3 is formed with a concave portion 33 between the two first coupling portions 31. A connecting surface 34 is connected between each first coupling portion 31 and the concave portion 33. The connecting surface 14 is an inclined surface. The connecting surface 34 is gradually tapered inward from each first coupling portion 31 toward the concave portion 33.

Figure 8:
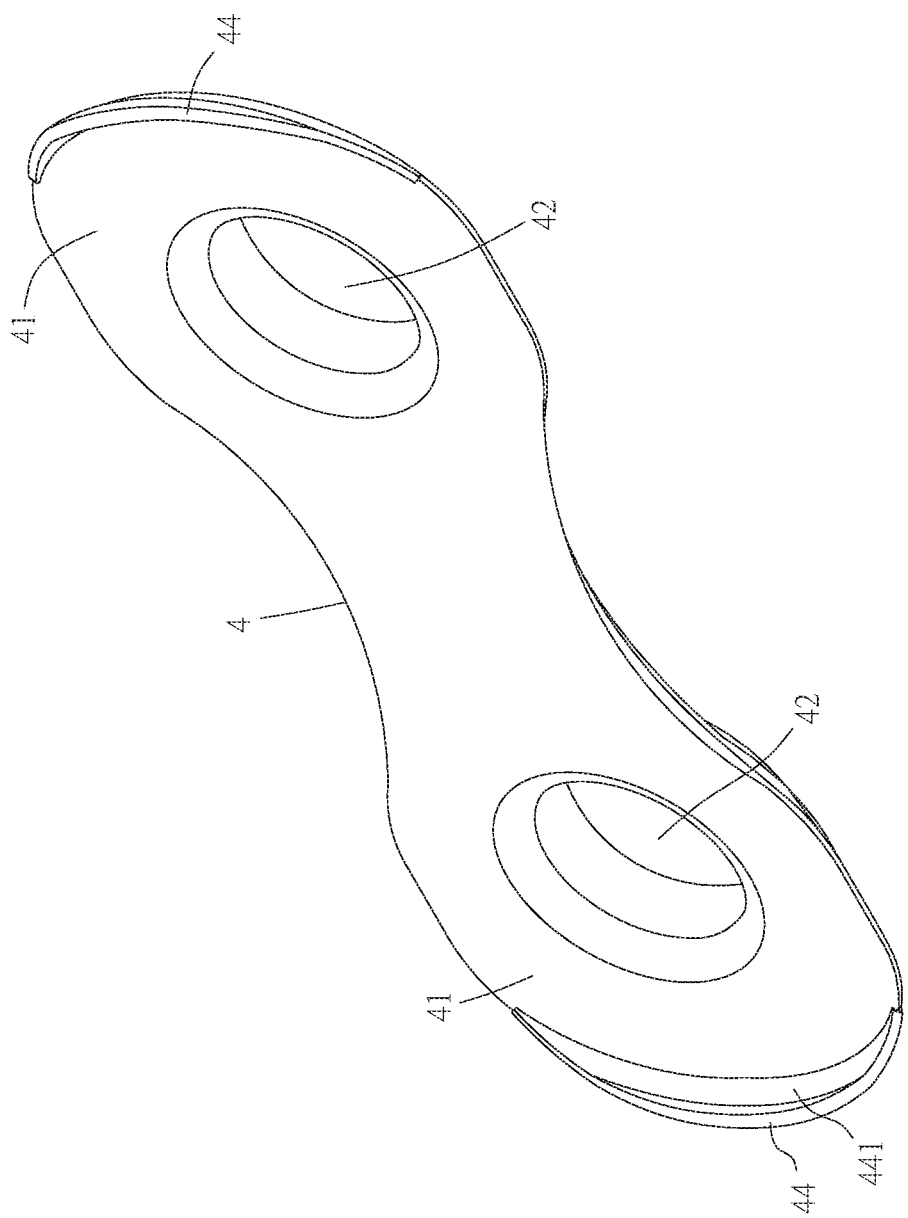
FIG. 8 is a perspective view of the inner link plate in accordance with the second embodiment of the present invention.
Figure 9:
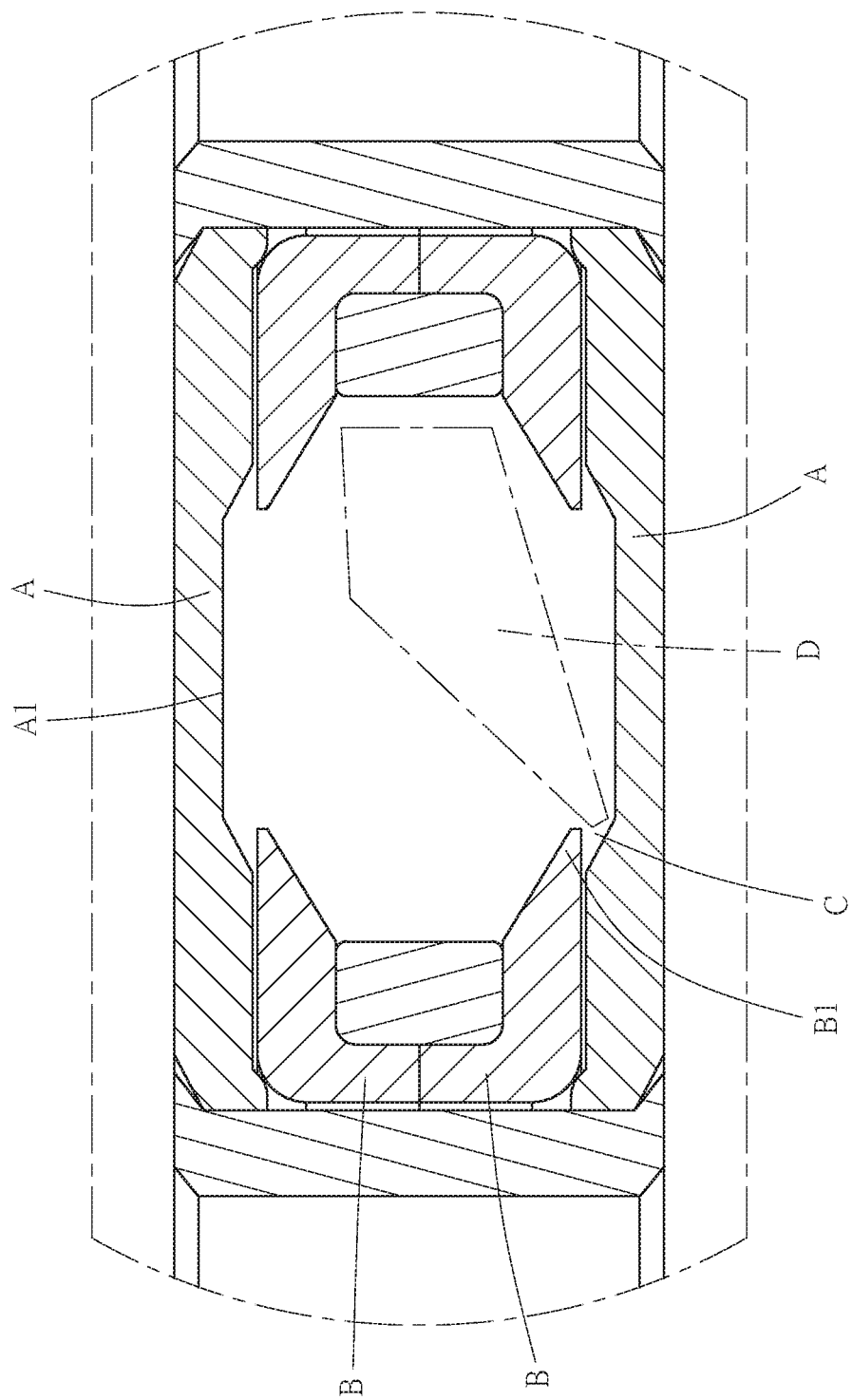
FIG. 9 is a cross-sectional view of the assembly of conventional outer and inner link plates.

The two inner link plates 4 (as shown in FIG. 8) are coupled between the inner sides of the two outer link plates 3. Two ends of each inner link plate 4 are provided with second coupling portions 41, respectively. Each second coupling portion 41 has a second pin hole 42 for a pin 43 to be inserted into the second pin hole 42 and the first pin hole 32 to connect the two inner link plates 4 and the two outer link plates 3. The outer side of each inner link plate 4 is provided with a pair of bent portions 44 each extending from the outermost edge of each second coupling portion 41 toward the connecting surface 34. A surface 441 of each bent portion 44 is another inclined surface corresponding in shape to the connecting surface 34. A gap F is defined between each bent portion 44 and the connecting surface 34. The gap F is less than the minimum thickness of a narrow tooth E2 of a chainring.

The only difference between the second embodiment and the first embodiment is that the connecting surface 34 is an inclined surface and the surface 441 of each bent portion 44 is another inclined surface corresponding in shape to the connecting surface 34, such that the gap F between the bent portion 44 and the connecting surface 34 is less than the minimum thickness of the narrow tooth E2. The tooth E2 will not be caught in the gap F when the chain is shifted. Thus, the tooth E2 will not be jammed, and the outer link plates 3 and the inner link plates 4 will not be pried to separate from each other to break the chain. Therefore, its safety can be ensured in use. Moreover, the chain can be positioned quickly when it is shifted without making any noise.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A link connecting structure, comprising:
at least two outer link plates arranged to face each other, two ends of each outer link plate being provided with first coupling portions, respectively, each first coupling portion having a first pin hole, an inner side of each outer link plate being formed with a concave portion between the two first coupling portions, a connecting surface being connected between each first coupling portion and each corresponding concave portion, and each connecting surface being sloped to gradually taper inward from a corresponding one of the first coupling portions toward the respective concave portion;

at least two inner link plates coupled between the inner sides of the at least two outer link plates, two ends of each inner link plate being provided with second coupling portions, respectively, each second coupling portion having a second pin hole for a pin to be inserted into the second pin hole and the first pin hole to connect the at least two inner link plates and the at least two outer link plates, an outer side of each inner link plate being provided with a pair of bent portions, each bent portion being sloped in correspondence with and in spaced relationship with the slope of a corresponding connecting surface to extend from an outermost edge of each second coupling portion toward each corresponding connecting surface, thereby forming a gap between each bent portion and the corresponding connecting surface, and the gap being less than a thickness of a tooth of a chainring.

2. The link connecting structure as claimed in claim 1, wherein each connecting surface is a curved surface.

3. The link connecting structure as claimed in claim 2, wherein a surface of each bent portion is another curved surface corresponding in shape to each connecting surface.

4. The link connecting structure as claimed in claim 1, wherein each connecting surface is an inclined surface.

5. The link connecting structure as claimed in claim 4, wherein a surface of each bent portion is another inclined surface corresponding in shape to each connecting surface.

\* \* \* \* \*